(12) United States Patent
Tao et al.

(10) Patent No.: US 7,466,896 B2
(45) Date of Patent: Dec. 16, 2008

(54) PHOTONIC FABRIC DISPLAY WITH CONTROLLED PATTERN, COLOR, LUMINESCENCE INTENSITY, SCATTERING INTENSITY AND LIGHT SELF-AMPLIFICATION

(75) Inventors: Xiaoming Tao, Hong Kong (HK); Xiaoyin Cheng, Hong Kong (HK); Jianming Yu, Hong Kong (HK); Lijie Liu, Hong Kong (HK); Wang-wah Wong, Hong Kong (HK); Wing-kwong Tam, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 0 days.

(21) Appl. No.: 11/756,237

(22) Filed: May 31, 2007

(65) Prior Publication Data

US 2007/0281155 A1  Dec. 6, 2007

(51) Int. Cl.
*G02B 6/00* (2006.01)
*G02B 6/26* (2006.01)
*G02B 6/44* (2006.01)
(52) U.S. Cl. .......................... 385/147; 385/38; 362/556
(58) Field of Classification Search .................. None
See application file for complete search history.

(56) References Cited

U.S. PATENT DOCUMENTS

| | | | |
|---|---|---|---|
| 4,234,907 A * | 11/1980 | Daniel ........................ | 362/556 |
| 6,381,482 B1 * | 4/2002 | Jayaraman et al. .......... | 600/388 |
| 6,527,985 B1 | 3/2003 | Frank et al. | |
| 7,137,416 B2 * | 11/2006 | Brochier et al. ......... | 139/420 R |
| 7,274,844 B2 * | 9/2007 | Walt et al. ..................... | 385/38 |
| 2002/0151634 A1 * | 10/2002 | Rohrbaugh et al. ......... | 524/430 |
| 2003/0057362 A1 | 3/2003 | Karasawa | |
| 2003/0139048 A1 * | 7/2003 | Wong et al. ................. | 438/692 |
| 2003/0147812 A1 * | 8/2003 | Ueberle ..................... | 424/9.52 |
| 2004/0037091 A1 | 2/2004 | Guy | |
| 2004/0142168 A1 | 7/2004 | Hrubesh et al. | |
| 2006/0014172 A1 | 1/2006 | Muller et al. | |
| 2006/0158403 A1 | 7/2006 | Kuma | |
| 2006/0198119 A1 | 9/2006 | Hulse | |

* cited by examiner

*Primary Examiner*—Michelle R. Connelly-Cushwa
*Assistant Examiner*—Chris Chu
(74) *Attorney, Agent, or Firm*—Evan Law Group LLC (57) ABSTRACT

A method of making a photonic fabric display includes wrapping photonic fibers with a yarn, weaving the wrapped photonic fibers to form a fabric, printing a pattern on the fabric, surface treating the fabric, and coupling the photonic fibers with a light source to form a photonic fabric display.

28 Claims, 7 Drawing Sheets

PHOTONIC FABRIC DISPLAY WITH CONTROLLED PATTERN, COLOR, LUMINESCENCE INTENSITY, SCATTERING INTENSITY AND LIGHT SELF-AMPLIFICATION

The present application claims priority to U.S. Non-provisional application Ser. No. 11/586,730, entitled "Photonic Fabric Display with Controlled Graphic Pattern, Color, Luminescence Intensity, and Light Self-Amplification," which was filed on Oct. 26, 2006, the content of which is incorporated herein by reference.

The present application also claims the benefit of U.S. Provisional Application No. 60/730,036, entitled "Photonic Fabric With Controlled Pattern, Color, Luminescence Intensity, Scattering Intensity, and Light Self-Amplification", filed Oct. 26, 2005, the content of which is incorporated herein by reference.

BACKGROUND

Traditional illumination displays use optical fibers in a panel, where the surface of the optical fibers may be disrupted at desired locations to enable light to emit laterally, forming an intended graphic pattern or image. However, the luminescence intensity and scattering intensity of these displays are often unsatisfactory, highlighted with unattractive color patterns and under-performing light amplification.

Consequently, it is desirable to manufacture illumination displays with improved controlled patterns. It is also desirable to manufacture illumination displays with improved color, luminescence intensity, scattering intensity and light self-amplification.

BRIEF SUMMARY

According to one aspect, a method of making a photonic fabric display includes wrapping photonic fibers with a yarn, weaving the wrapped photonic fibers to form a fabric, printing a pattern on the fabric, surface treating the fabric, and coupling the photonic fibers with a light source to form a photonic fabric display.

According to another aspect, a method of making a coupler includes providing photonic fibers with terminal ends, binding the terminal ends, embedding the terminal ends into a tube, and inserting a light source into the tube in communication with the terminal ends.

According to a further aspect of the invention, a photonic fabric display includes a plurality of photonic fibers having terminal ends and forming a fabric, a pattern on the fabric, and a light source in communication with the terminal ends of the photonic fibers.

DETAILED DESCRIPTION

Figure 1:
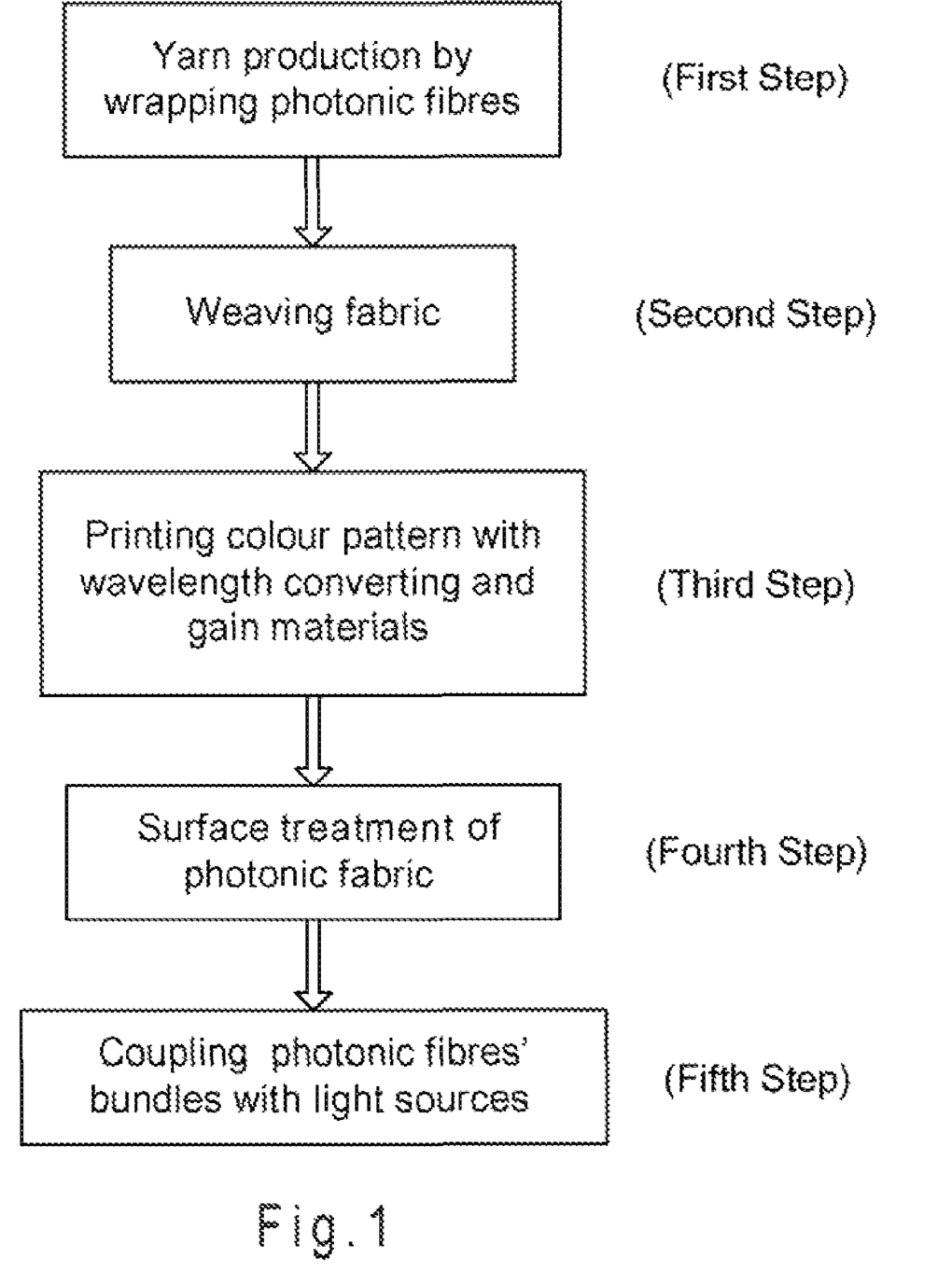
FIG. 1 depicts a flow chart of the fabrication process of making a photonic fabric display.

A method of making a photonic fabric display 18 includes wrapping photonic fibers 4 with yarn 5, weaving the wrapped photonic fibers to form a fabric 14, printing a pattern 3 on the fabric 14, surface treating the fabric 14, and coupling the photonic fibers 4 with a light source 8 to form the photonic fabric display 18, as depicted in FIG. 1. The method may further include adding a protective layer of finishing treatment 16 to the photonic fabric display 18.

Figure 2A:
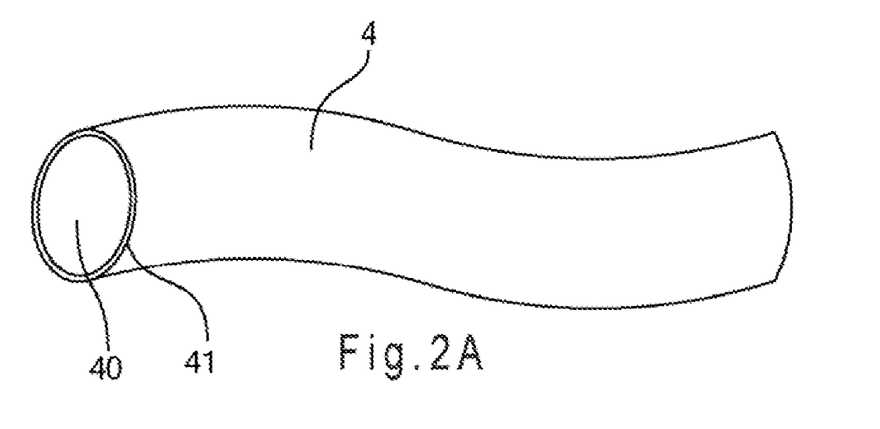
FIG. 2A depicts a single photonic fiber used in the process of FIG. 1.
Figure 2B:
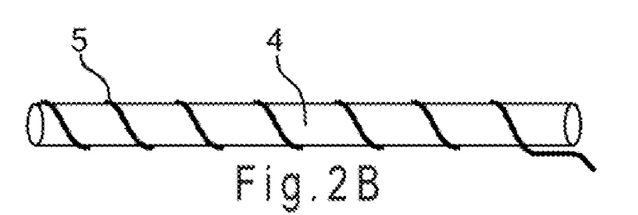
FIG. 2B depicts the photonic fiber of FIG. 2A as wrapped by a thread of yarn.
Figure 2C:
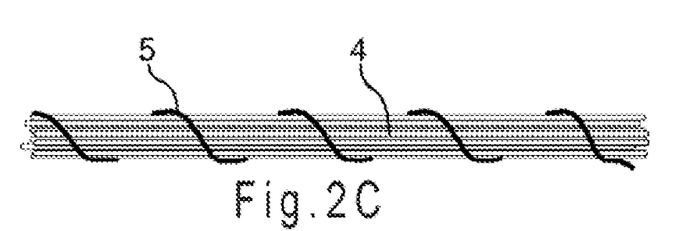
FIG. 2C depicts a bundle of photonic fibers of FIG. 2A as wrapped by a thread of yarn.

In the first step, yarn 5 may be used to wrap around a bare or unjacketed photonic fiber 4 having a core 40 and a cladding 41 covering the core 40, as depicted in FIG. 2A. The yarn 5 may include natural and/or man-made fibers, such as natural fibers, continuous filaments, staple yarn, fiber with optical gain materials, or combinations thereof. The materials used as yarn 5 may also be cotton, wool, silk, flax, metal, synthetic and man-made materials, or combinations thereof. The yarn 5 may be used to wrap a single photonic fiber 4, as depicted in FIG. 2B, or may be used to wrap a bundle of photonic fibers 4, as depicted in FIG. 2C.

The photonic fiber 4 may be silica or a polymeric material, such as poly(methyl methacrylate) (PMMA), polystyrene (PS), polycarbonate (PC), poly(ethyl acrylate) (PEA), poly(ethyl methacrylate) (PEMA), poly(methyl methacrylate-co-ethyl methacrylate) (PMMA/PEMA), or combinations thereof. The diameter of the photonic fiber 4 may vary from about 10 micrometers to about 3000 micrometers, preferably from about 25 micrometers to about 1000 micrometers. The photonic fiber 4 may be of single-mode or multi-mode. The photonic fiber 4 may have excellent transmittance and workability in the visible range, such as a low attenuation of less than 0.3 db/m. The photonic fiber 4 may convey light that flows from one end to another end and may emit light only at desired locations.

Figure 3:
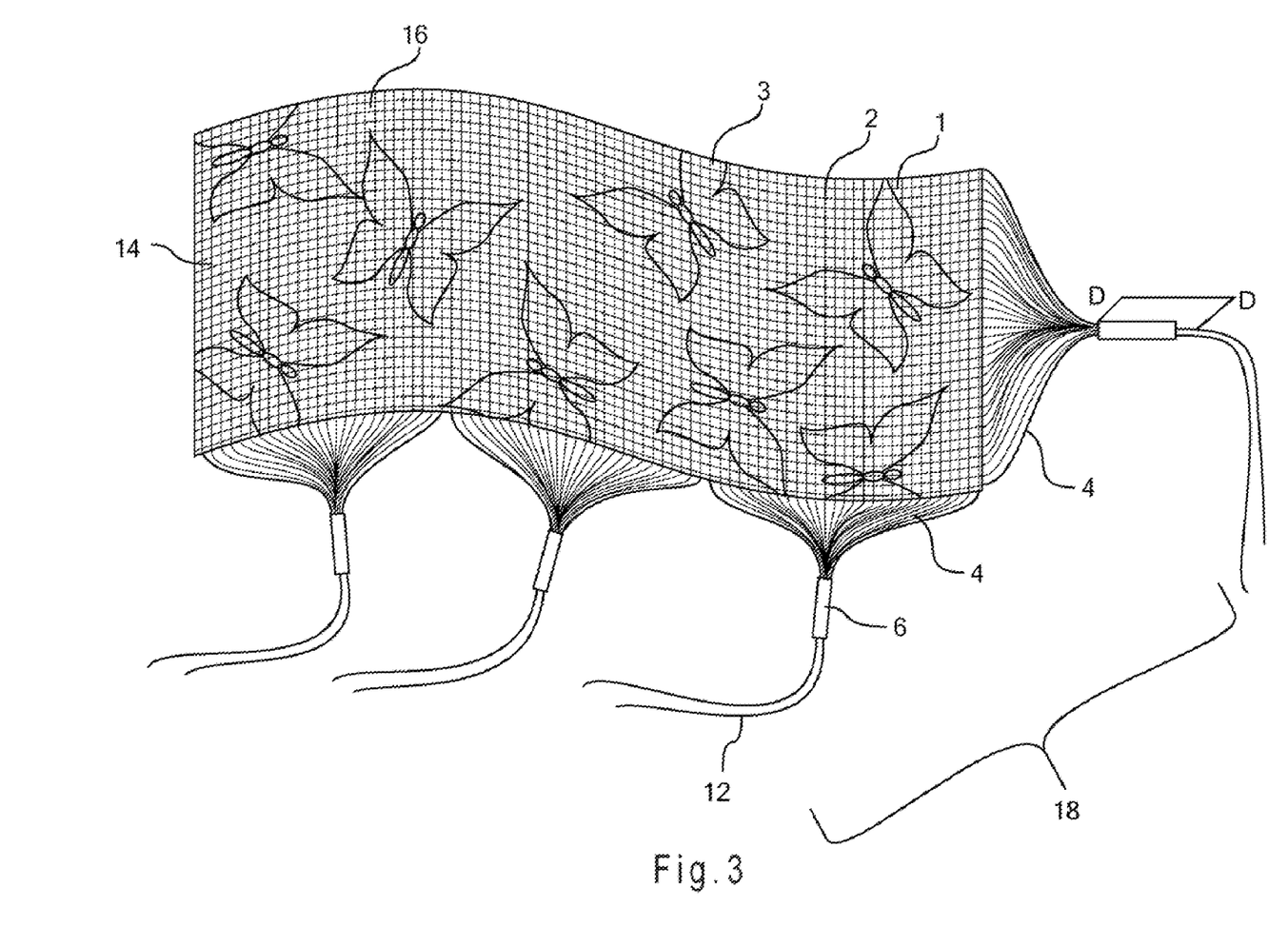
FIG. 3 depicts an embodiment of a photonic fabric display fabricated by the process of FIG. 1.

In the second step, the wrapped photonic fibers may be woven to form a fabric 14, as depicted in FIG. 3. A weft yarn 1 of wrapped photonic fibers and a warp yarn 2 of wrapped photonic fibers may also be used to produce the fabric 14 of photonic fibers. Various patterns 3 may be woven in the fabric 14. The wrapped photonic fibers may be single-wrapped or wrapped in a bundle. In one example, the fabric is a two-dimensional surface or layer. In another example, the fabric is a three-dimensional structure. The wrapped photonic fibers may be woven by hand, or by using a loom such as a rapier, a shuttle loom controlled by a computer or manipulated by hand, or combinations thereof. Other techniques such as knitting, braiding, needle punching, water-jet, spun bonding, embroidering and textile assembling may also be used.

Figure 5:
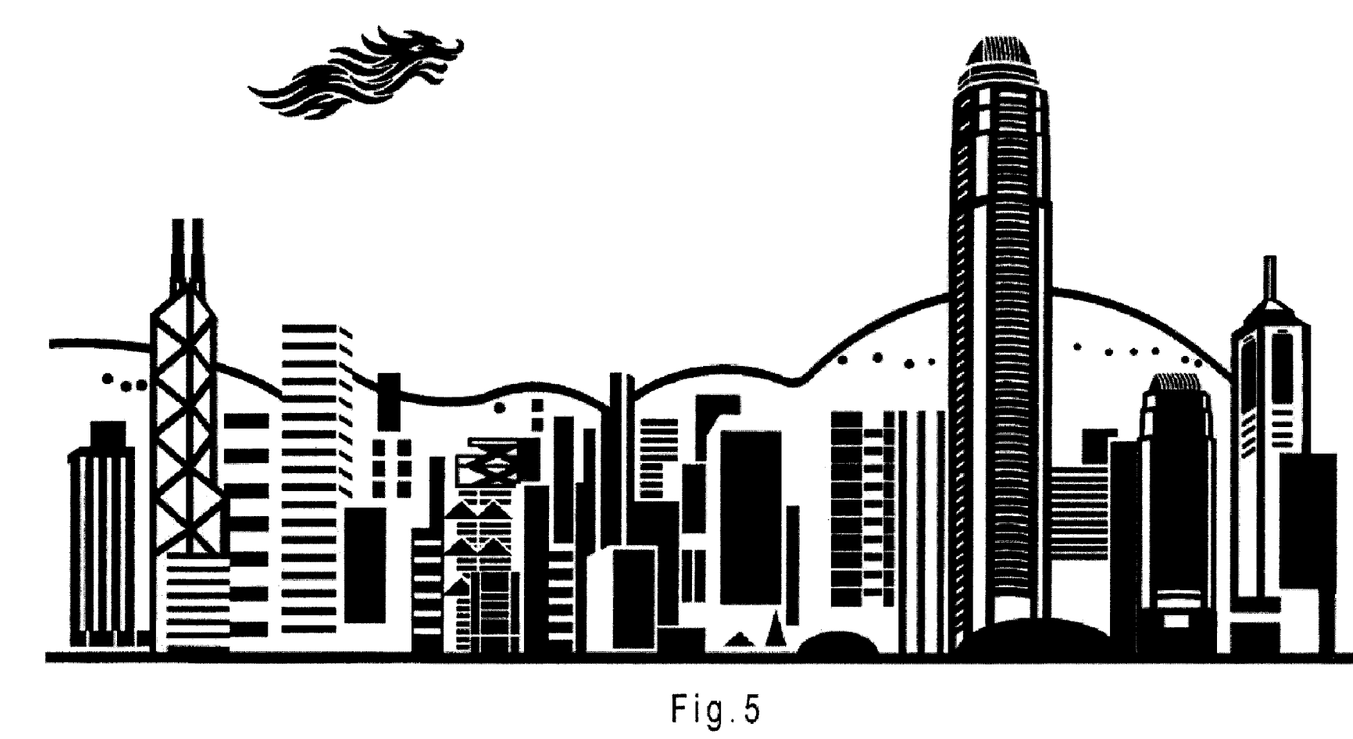
FIG. 5 depicts an example of a photonic fabric display as used in a painting-formatted art decor.

In the third step, various patterns 3 may be printed on the surface of the fabric 14 according to known printing techniques in the arts. In one example, a screen-printing technique may be used, as depicted in FIG. 5. Other printing techniques may include offset printing, gravure printing, letterpress printing, and digital printing. The pattern may be printed with or without colors.

Wavelength-converting materials may be added to the print paste to change the color of the fabric 14, and optical gain materials may be added to the print paste to increase the luminescence intensity and contrast of the pattern on the fabric 14 by light self-amplification. Examples of wavelength-converting materials may include dyes, polymers, semiconductors, phosphors, nanoparticles, sub-micron particles, or combinations thereof. These materials may be excited by radiation at one wavelength and emit light at another wavelength. In the visible range, this conversion may cause a color change. For example, the fluorescent dye "Fura Red" may be excited by light at a wavelength of about 436 nm and emit light at wavelength of about 657 nm, thus causing a color change from blue to red.

Examples of fluorescent dyes/pigments may include lucifer yellow CH, Fura Red, POPO™-3 iodide, BODIPY® TMR-X, BO-PRO™-3 iodide, Calcium Orange™ and SNAPF®-1 carboxylic acid. Examples of laser dyes may include Coumarin, Stilbene and Rhodamine compounds, such as Coumarin 307, 480 and 540, Stilbene 420 and Rhodamine 590. Examples of conducting polymers may include polyphenylenevinylene (PPV), polyphenylene (PPH), and their derivatives; inorganic laser crystal powder; or combinations thereof. Examples of nanoparticles or sub-micron particles may include titania, zinc oxide, zirconia, metal particles, or combinations thereof, and may be used to increase surface area.

Without being bound by theory, it is believed that in a composite having a polymeric matrix doped with optical gain materials or randomly distributed nano-sized or sub-micron sized particles, an incident light may be scattered and may cause the path length of the photons to increase. This may then cause amplified spontaneous emission (ASE), where the amplification of light may be realized at the wavelength where ASE occurs. It is noted that adding wavelength-converting and optical gain materials inside the core of photonic fiber 4 while the photonic fibers 4 are being prepared may produce similar effects.

In the fourth step, the fabric 14 of photonic fibers may be surface treated at the locations of the patterns 3 or images to improve lateral illumination. Specifically, surface treatment may enable light to be emitted laterally from the desired locations and form an intended graphic pattern or image. Surface treatment may be performed before the printing step described previously, and may take the form of a surface chemical treatment. Fine surface treatment may also be performed after the printing step, and may take the form of chemical treatment, laser treatment, mechanical treatment, or combinations thereof, according to one skilled in the art. The treatment may also be computer-controlled and may be performed on the pattern 3 of the photonic fabric to obtain color shade effects.

Laser treatment may allow the side-emitting intensity of pattern 3 to be controllable. For example, the laser source may be 355 nm third harmonic or 532 nm double-frequency Nd:YAG laser with 8 ns pulse width and 10 Hz repetition, focused by using a convex lens with a focal length of 25 cm and a diameter of 4 cm. Without being bound by theory, it is believed that the diameter of a focus spot may be obtained according to Rayleigh Criterion: $d=1.22\lambda f/D$, where d is the diameter of focus spot, $\lambda$ is the wavelength of light, f is the focal length of the lens, and D is the diameter of the lens. Thus, a diameter (d) of 2.7 micrometers requires a wavelength ($\lambda$) of 355 nm, and a diameter (d) of 4.06 micrometers requires a wavelength ($\lambda$) of 532 nm.

To apply laser treatment, the photonic fabric 18 may be first fixed on a one-dimension adjustable stand. Then, the laser beam may be focused on the photonic fabric 18. When the LED is incident on the photonic fabric 18, a photometer or a CCD camera may be used to measure the intensity of the side-emitting light. By controlling the laser energy and the exposure time, the leaking light from the photonic fibers 4 may be controlled. Table 1 lists leaking intensity for various combinations of laser energy and exposure time. It the leaking intensity becomes stronger with increased laser energy and exposure time.

TABLE 1

Leaking intensity changes with the laser energy and exposure time

| Pump Intensity (mW) | Exposure Time (s) | Leaking Intensity ($\mu W/cm^2$) |
|---|---|---|
| 24 | 3 | 3.4 |
| 24 | 2 | 3.5 |
| 24 | 1 | 1.1 |
| 24 | 1 | 0.9 |
| 20 | 4 | 2.7 |
| 20 | 2 | 2.7 |
| 20 | 2 | 3.4 |

Chemical surface treatment may be used to a achieve large-area, well-proportioned lateral emitting effect. Acts due to dissolution, swelling, grafting, and wetting by chemical agents may be used to modify the cladding of photonic fiber 41 that emits light. To improve the ASE effect as described in step three, nanoparticles may be mixed with the solvent during chemical surface treatment of the photonic fibers 4, or nanoparticles may be printed again after the chemical surface treatment.

Selecting a suitable solvent and procedure may minimize damage to the photonic fibers 4. Suitable chemical agents may include methyl ethyl ether (MEE), acetone, acetic acid, ethyl acetate and tetrahydrofuran, etc. The chemical agents may be sprayed on the pattern surface of the photonic fabric, or the pattern surface of the photonic fabric may be directly dipped in the chemical solution and dried at room temperature. For example, MEE and $TiO_2$ nanoparticles may be sprayed on the pattern surface of photonic fabric 18. A method of applying a chemical treatment may include pre-washing the photonic fabric 4 with a paraffin remover such as gasoline, spraying a chemical solution on the pattern area 3, keeping the solution on the pattern for about 10 minutes, and drying at room temperature.

Mechanical treatment may be used on the surface of the photonic fabric display 18, which may be performed manually or by computers. Manual mechanical treatment may include using tools such as knives with a particular shape, forceps, nippers, tweezers, embossing rollers and cylinders. However, these tools may cause extensive scratches on the surface of the photonic fabric display 18. Preferably, computer-controlled programs are used to apply the mechanical treatment. For example, side notching may be performed with a motion-limited press that may be equipped with an embossing roller. When closing the press, the roller may abrade the photonic fiber warp. The weft having high flexibility may not be damaged, and it may be able to move under the rollers.

Figure 4A:
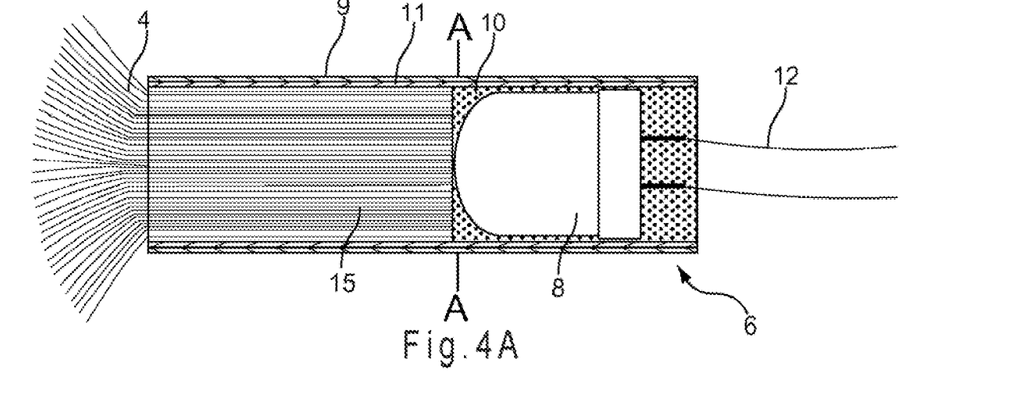
FIG. 4A depicts a cross-sectional view of a coupler, which shows the coupling between the end of the photonic fibers and a light source.

In the fifth step, the terminal ends 15 of photonic fibers 4 and a light source 8 may be coupled to form the photonic fabric display 18, as depicted in FIG. 4A. A coupler 6 may be introduced to improve coupling efficiency. The coupler 6 may be made of plastic, such as a thermoplastic material, or a metal. A method of making the coupler 6 may include binding the terminal ends 15 of the photonic fibers 4, embedding the terminal ends 15 into a tube 9, filling the tube 9 with an optic resin 10, and inserting the light source 8 into the tube 9 in communication with the terminal ends 15.

To provide the optic resin 10, the components of a 2-part resin precursor may be mixed, stirred and then allowed to sit at a low temperature of about 5 to 10° C. to remove air in the mixed resin 10. Part A of the resin precursor may include basic resin, and Part B of the resin precursor may include curing agents. The optic resin 10 may include materials such as epoxy. The optic resin 10 may also be used to fill the tube 9. One important consideration in selecting optic resin 10 to fill the gap between the light source 8 and the terminal ends 15 of the photonic fiber 4 is the refractive index. Preferably, the refractive index of the optic resin 10 is matched closely with that of the core of the photonic fibers and that of the light source cover, in order to minimize the loss by reflection at the interfaces. In one example, when photonic fibers 4 are made of PMMA, the refractive index may be around 1.49. In another example, when the light source cover is made of epoxy oligomer, the refractive index may be about 1.5.

Figure 4B:
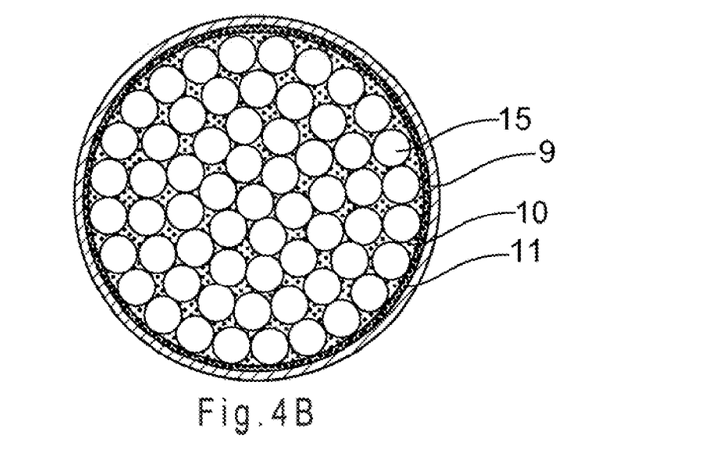
FIG. 4B depicts a cross-sectional left view of the coupler that cuts along line A-A of FIG. 4A.

The terminal ends 15 of the photonic fibers 4 may be wiped off and bound together, as depicted in FIG. 4B. To bind the photonic fibers 4, the terminal ends 15 of the photonic fibers 4 may be grouped together, cured by UV curing glue or thermal curing processes, and cut along the vertical section. Gas absorbed on the surface of the photonic fibers 4 may be removed by air suction. The terminal ends 15 may be polished using various finishing papers. The bound terminal ends 15 may then be dipped into the mixed optic resin 10 and embedded into the tube 9, as depicted in FIGS. 4A and 4B.

Figure 4C:
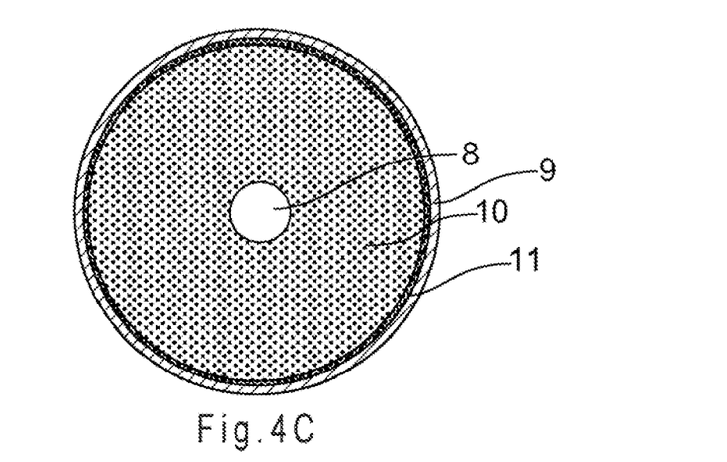
FIG. 4C depicts a cross-sectional right view of the coupler that cuts along line A-A of FIG. 4A.

The tube 9 may be internally coated with a reflective layer 11, as depicted in FIGS. 4B and 4C, which may serve as a cylindrical mirror that may be used to contain the light beam inside the cylindrical mirror and decrease leakage loss. The reflective layer 11 may include materials such as aluminum film.

The gas on the surface of the light source 8 may be removed, and the light source 8 may be dipped into the mixed optic resin 10. Subsequently, the light source 8 may be inserted into the tube 9 in communication with the terminal ends 15 of the photonic fibers 4, as depicted in FIGS. 4A and 4C. Preferably, the light source 8 is placed tightly closed to the terminal ends 15 of the photonic fibers, such that there is no air between them. Hence, light may propagate into the photonic fibers 4 with minimal reflection loss at the terminal end-light source interface. For example, a coupling efficiency of about 35% may be achieved. The coupler 6 may then be cured at about 50° C. in a controlled temperature chamber.

The light source 8 may be a light emitting diode (LED). LEDs are available with different wavelengths, such as red, blue, green and white, and may be connected to a power supply through electrical wire 12, as depicted in FIGS. 3 and 4A. Rechargeable batteries or AC-DC converters may be adapted as a power supply through electrical wire 12 for the light source 8.

The color and luminescence intensity of the light source 8 may be adjusted by adapting various converters or various color LEDs controlled by programmable circuits, which determine the light intensity and color of the LEDs. A coating including a converter may be added onto the light source 8 to change the wavelength of the light emitted and/or to amplify the intensity of the emitting light at a desired wavelength, which may vary from about 10 nanometers to about 100 nanometers. Constant current drive circuits for ultra-light LEDs and dynamic scanning display circuits with multiple LEDs may be adapted to provide different luminescent effects. Printed circuit boards (PCBs) may provide flexibility and miniaturization for easy integration in apparel, art and furniture. For example, flexible PCBs that control LEDs may be integrated into garments and apparel. FIG. 5 shows a painting-formatted art decor made from a photonic fabric display.

The method may further include adding a protective layer 16 of finishing treatment on the surface of the photonic fabric display 18. For example, the display 18 may be treated with a protective layer that is antibacterial, waterproof, oil-proof, soil-proof, self-cleaning, or combinations thereof. A repellent agent, such as Lotus Nano® repellent agent or SCOTCH GARD™, may be sprayed on the surface on the display 18 and dried completely at room temperature to form a light protective coat. In another example, the protective layer 16 may include a water repellent or soil release film. These protective layers 16 may be transparent to allow light to emit out, but may isolate the display 18 from the environment.

The photonic fabric display 18 may include a plurality of photonic fibers 4 having terminal ends 15 and forming a fabric 14, a pattern 3 on the fabric, and a light source 8 in communication with the terminal ends of photonic fibers 15, as depicted in FIGS. 3 and 4A.

The photonic fabric display 18 may be used in applications including apparel or garments; sport articles; accessories; interior decorations such as curtains, tents, moquette, arras, coatings, pillows, covers, bed sheets, and wallpapers; automobile articles such as upholstery; safety articles; advertising articles such as portable posters; adornments and arts such as decorative pictures, paintings, vases and cornices; illuminative articles such as lamp-chimneys for floodlight, head lamps, jacklights, and spotlights; scientific popularization articles such as wall maps; advertisement articles; entertainment articles such as toys and holiday cards; and fabric display screens.

The photonic fabric display is further illustrated by the following examples, which are not to be construed in any way as imposing limitations upon the scope thereof. On the contrary, it is to be clearly understood that resort may be had thereof which, after reading the description herein, may suggest themselves to those skilled in the art without departing from the spirit of the specification and/or the scope of the appended claims.

EXAMPLES

Example 1

The Photonic Fabric Display as Used in Painting-Formatted Art Decor

The painting-formatted art decor made by a photonic fabric display is shown in FIG. 5, which depicts the Harbor View of Hong Kong. Electronic circuits were used to control the patterns, luminescent effects, and display mode.

Example 2

The Photonic Fabric Display as Used in a Luminescent Costume

Figure 6:
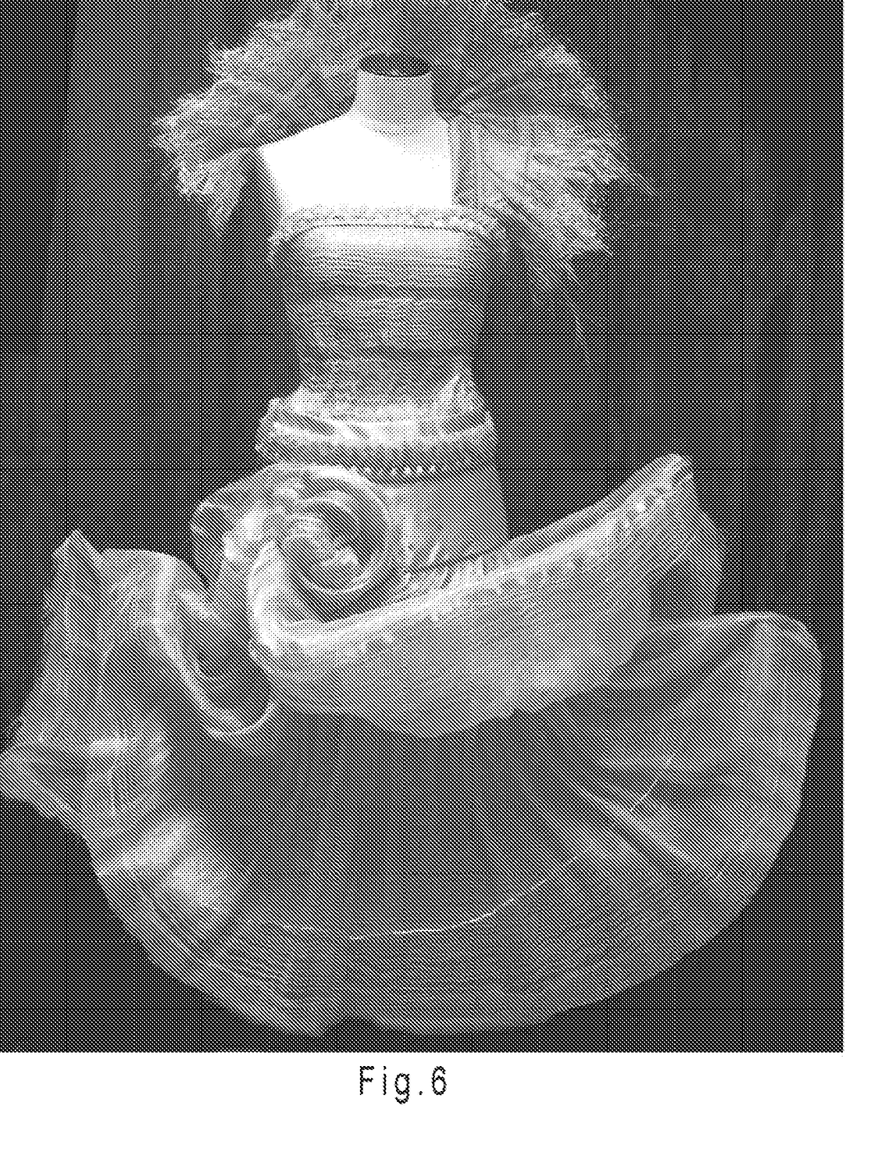
FIG. 6 depicts another example of a photonic fabric display as used in a luminescent costume.

The luminescent costume for a ballerina made by a photonic fabric display is shown in FIG. 6. The costume had three layers of light and soft photonic fabric display, each layer having a different color, luminescence pattern and intensity.

The fabric included polymeric photonic fibers blended with silk and polyester fibers, and fabricated to provide the desired light transmission and scattering properties, flexibility, drape and handle of textiles for the dancing costume. LEDs were coupled to the fabric, and power supplies were seamlessly integrated into the design of the costume.

Example 3

Other Examples of the Photonic Fabric Display as Used in a Dining Room

Figure 7:
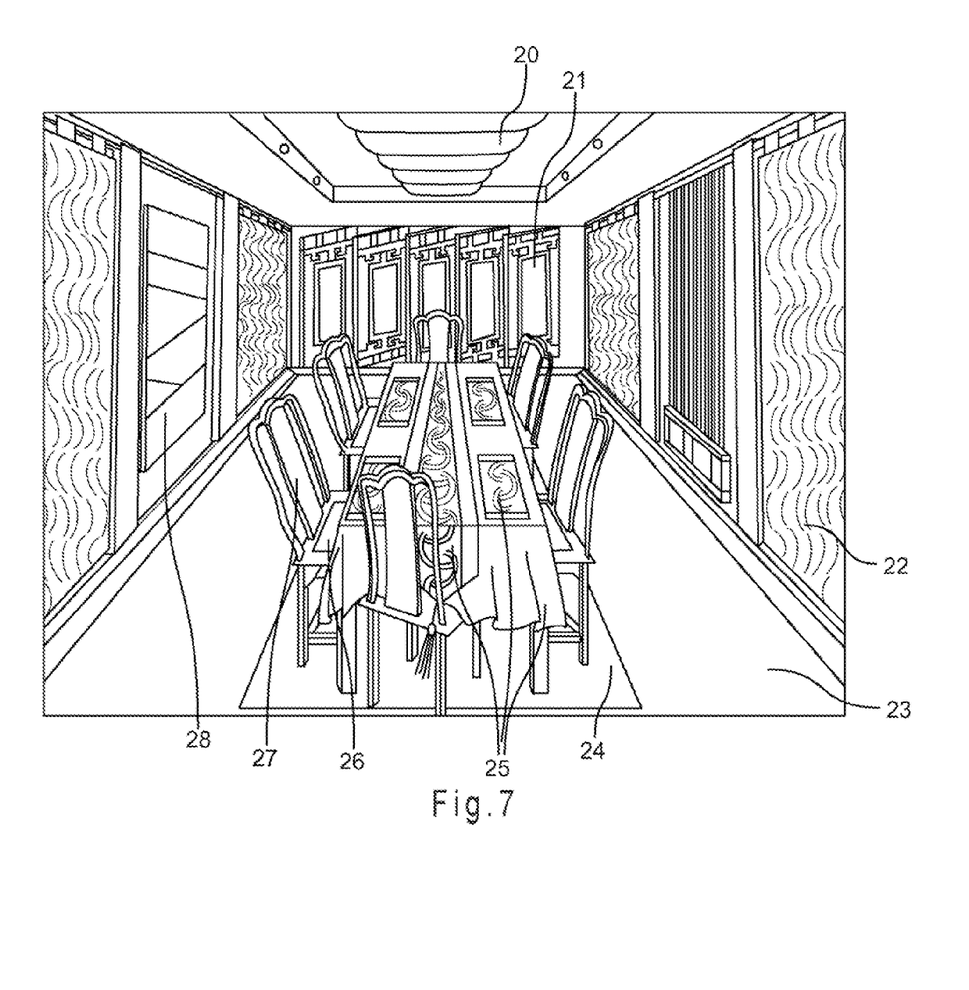
FIG. 7 depicts other examples of photonic fabric displays used as fabric decorations in a dining room.

The interior of a dining room furnished with photonic fabric displays is shown in FIG. 7. The wall fabric 22 and decorative picture 28, made from a number of light weight and thin double-sided luminescent photonic fabric displays, were hung on the inside walls of the dining room. These photonic fabric displays were capable of producing diffuse and soft light and were able to change the light color of the fabric displays in response to music that was being played.

FIG. 7 also shows a retractable droplight 20 made from photonic fabric displays hung under the roof. Through using different weaving style and gain materials, the droplight 20 produced more bright lights than those photonic fabric displays 22 hung on the wall. Through a glass floor board, a three-layered colored luminescent photonic fabric display 23 with tunable color and controllable light intensity was seen.

The double-sided luminescent folding screen 21 and the dining table became the main parts of the room. The folding screen 21 had a wooden framework. On this framework was a luminescent photonic fabric display made from photonic fibers and flax fabrics. Various patterns were printed on the fabrics by employing screen print techniques. These patterns emitted splendid colorful light.

The dining table and chairs were typical Chinese-style wooden furniture. With the exception of the pottery tableware, the remaining items on the dining table, including a tablecloth 25, tableware, a table lamp, a backrest 27 and the chair cushion 26, were all made of photonic fabric displays including photonic fibers and flax fabrics. The methods for making the patterns on the fabrics were the same as those for the patterns on the folding screen 21.

A carpet 24, made from a photonic fabric display by weaving from fancy yarns and optical fibers, was laid under the dining table, and gave a thick and soft feel. The pattern on the carpet 24 was made from a transparent hollow design. Light emitting from the hollow pattern part of the carpet 24 created a pleasing visual effect.

The design of the dining room in FIG. 7 incorporated both the simple and unsophisticated style of modernity and traditional Chinese decoration, and also modern advanced technologies. The use of photonic fabric displays, of various design patterns in simple Chinese style, and of the splendid luminescent effects helped to create a dining room with a modern appearance.

What is claimed is:

1. A method of making a photonic fabric display, comprising:
   wrapping photonic fibers with a yarn;
   weaving said wrapped photonic fibers to form a fabric;
   printing a pattern on said fabric;
   surface treating said fabric; and
   coupling said photonic fibers with a light source to form a photonic fabric display.

2. The method of claim 1, wherein said weaving comprises looming, knitting, braiding, embroidering, textile assembling, or combinations thereof.

3. The method of claim 1, wherein said printing comprises screen-printing, offset printing, gravure printing, letterpress printing, digital printing, or combinations thereof.

4. The method of claim 1, wherein said surface treating comprises applying a surface chemical treatment, a laser treatment, a mechanical treatment, or combinations thereof.

5. The method of claim 4, wherein said surface treating comprises applying a laser treatment with a laser source of 355 nm third harmonic.

6. The method of claim 4, wherein said surface treating comprises applying a laser treatment with a laser source of 532 nm double-frequency Nd:YAG laser.

7. The method of claim 4, wherein said surface treating comprises applying a surface chemical treatment with methyl ethyl ether (MEE), acetone, acetic acid, ethyl acetate, or tetrahydrofuran on said pattern.

8. The method of claim 7, wherein said applying a surface chemical treatment comprises spraying MEE and $TiO_2$ nanoparticles on said pattern.

9. The method of claim 4, wherein said surface treating comprises applying a mechanical treatment by side notching said pattern with a motion-limited press.

10. The method of claim 1, further comprising adding a protective layer of finishing treatment on said photonic fabric display.

11. The method of claim 10, wherein said protective layer is antibacterial, waterproof, oil-proof, soil-proof, self-cleaning, or combinations thereof.

12. A photonic fabric display, comprising:
   a plurality of photonic fibers having terminal ends and forming a fabric;
   a pattern on said fabric;
   a light source in communication with said terminal ends of said photonic fibers, and
   yarn wrapped around at least one of said photonic fibers.

13. The photonic fabric display of claim 12, wherein said photonic fibers comprise a core and a cladding covering said core.

14. The photonic fabric display of claim 12, wherein said yarn comprises natural fibers, continuous filaments, staple yarn, cotton, wool, silk, flax, metal, or combinations thereof.

15. The photonic fabric display of claim 12, wherein said photonic fibers comprise materials selected from the group consisting of poly(methyl methacrylate) (PMMA), polystyrene (PS), polycarbonate (PC), poly(ethyl acrylate) (PEA), poly(ethyl methacrylate) (PEMA), poly(methyl methacrylate-co-ethyl methacrylate) (PMMNPEMA), and combinations thereof.

16. The photonic fabric display of claim 12, wherein said photonic fibers have a diameter of about 10 to about 3000 micrometers.

17. The photonic fabric display of claim 12, wherein said photonic fibers have a diameter of about 25 to about 1000 micrometers.

18. The photonic fabric display of claim 12, wherein said pattern comprises wavelength-converting materials.

19. The photonic fabric display of claim 18, wherein said wavelength-converting materials comprise fluorescent dyes, laser dyes, conductive polymers, polymers, semiconductors, phosphors, nanoparticles, or combinations thereof.

20. The photonic fabric display of claim 19, wherein said wavelength-converting materials comprise a fluorescent dye selected from the group consisting of lucifer yellow CH-1, Fura Red, POPO-3 iodide, BODIPY TMR-X, BO-PRO-3 iodide, Calcium Orange, SNAPF-1 carboxylic acid, and combinations thereof.

21. The photonic fabric display of claim 19, wherein said wavelength-converting materials comprise a laser dye selected from the group consisting of Coumarin compounds, Stilbene compounds, Rhodamine compounds, conducting polymers, inorganic laser crystal powder, and combinations thereof.

22. The photonic fabric display of claim 19, wherein said wavelength-converting materials comprise nanoparticles selected from the group consisting of titania, zinc oxide, zirconia, metal particles, and combinations thereof.

23. The photonic fabric display of claim 12, wherein said light source comprises a light emitting diode.

24. The photonic fabric display of claim 12, wherein said light source comprises a coating comprising a converter.

25. The photonic fabric display of claim 12, wherein said light source emits light at a wavelength from about 10 to about 100 nanometers.

26. The photonic fabric display of claim 12, further comprising a coupler, said coupler housing said terminal ends of said photonic fibers and said light source.

27. A decoration article, comprising a body and the photonic fabric display of claim 12 attached to said body.

28. The decoration article of claim 27, wherein said decoration article is selected from the group consisting of a wall fabric, a decorative picture, a retractable droplight, a layered colored luminescent display, a floor screen, a tablecloth, a backrest, a folding screen, a chair cushion, and a carpet.

* * * * *